United States Patent
Wu et al.

(10) Patent No.: US 11,166,241 B2
(45) Date of Patent: Nov. 2, 2021

(54) CONTROLLING RADIO FREQUENCY (RF) POWER OUTPUT OF PORTABLE DEVICES

(71) Applicant: HEWLETT-PACKARD DEVELOPMENT COMPANY, L.P., Houston, TX (US)

(72) Inventors: Kun-Jung Wu, Taipei (CN); Simon Wong, Houston, TX (US); Hung-Wen Cheng, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 672 days.

(21) Appl. No.: 16/075,680

(22) PCT Filed: Jun. 19, 2017

(86) PCT No.: PCT/US2017/038083
§ 371 (c)(1),
(2) Date: Aug. 6, 2018

(87) PCT Pub. No.: WO2018/236335
PCT Pub. Date: Dec. 27, 2018

(65) Prior Publication Data
US 2021/0204225 A1 Jul. 1, 2021

(51) Int. Cl.
*H04W 52/28* (2009.01)
*H04W 52/36* (2009.01)
*H04W 88/02* (2009.01)

(52) U.S. Cl.
CPC ....... *H04W 52/283* (2013.01); *H04W 52/288* (2013.01)

(58) Field of Classification Search
CPC ............. H04W 52/283; H04W 52/288; H04W 52/367; H04W 88/02
See application file for complete search history.

(56) References Cited

U.S. PATENT DOCUMENTS

| | | | |
|---|---|---|---|
| 6,418,536 B1 * | 7/2002 | Park | G06F 1/3231 713/323 |
| 7,502,220 B2 * | 3/2009 | Shudo | G06F 1/1656 361/679.3 |
| 7,561,146 B1 * | 7/2009 | Hotelling | G06F 3/042 345/175 |
| 7,945,794 B2 * | 5/2011 | Chen | G06F 1/1616 713/320 |
| 9,235,422 B2 | 1/2016 | Detter et al. | |
| 9,531,420 B1 | 12/2016 | Prendergast et al. | |

(Continued)

OTHER PUBLICATIONS

"User Guide For Windows 8.1 Tablet-laptop TL10IE", Retrieved from Internet: https://www.intel.com/content/dam/support/us/en/documents/education/solutions/sb/TL10IE2_user_manual.pdf, 2014, 46 Pages.

*Primary Examiner* — Dominic E Rego
(74) *Attorney, Agent, or Firm* — HPI Patent Department (57) ABSTRACT

Techniques for controlling RF output of portable devices are described. In an example, an indication of a mode of a portable device is received. The mode is based on an inclination of the portable device. The inclination is measured in reference to a screen of the portable device and a horizontal surface. Based on the mode, an RF power level defined for the mode is determined. The RF power output of the portable device is controlled based on the RF power level.

12 Claims, 7 Drawing Sheets

(56) References Cited

U.S. PATENT DOCUMENTS

| | | | |
|---|---|---|---|
| 9,552,020 B2 | 1/2017 | Takasu | |
| 9,588,569 B2 | 3/2017 | Fu | |
| 2006/0072215 A1* | 4/2006 | Nishi | G02B 27/0172 |
| | | | 359/708 |
| 2007/0037619 A1 | 2/2007 | Matsunaga et al. | |
| 2009/0144574 A1* | 6/2009 | Tseng | G06F 1/1616 |
| | | | 713/323 |
| 2010/0141689 A1* | 6/2010 | Johnson | G06F 1/1647 |
| | | | 345/690 |
| 2010/0213340 A1* | 8/2010 | Rice | A45C 11/00 |
| | | | 248/346.5 |
| 2012/0169276 A1* | 7/2012 | Wang | H02J 50/40 |
| | | | 320/108 |
| 2013/0033809 A1* | 2/2013 | Schlesener | G06F 1/1616 |
| | | | 361/679.27 |
| 2014/0141733 A1 | 5/2014 | Wong et al. | |
| 2014/0347814 A1* | 11/2014 | Zaloom | A45C 13/36 |
| | | | 361/679.56 |
| 2015/0301641 A1* | 10/2015 | Sultenfuss | G06F 1/16 |
| | | | 345/177 |
| 2016/0085268 A1* | 3/2016 | Aurongzeb | G06F 1/1652 |
| | | | 345/156 |
| 2017/0060207 A1* | 3/2017 | Backman | G06F 3/0346 |
| 2017/0063168 A1* | 3/2017 | Uchida | H02J 50/90 |
| 2017/0168594 A1* | 6/2017 | Tsuji | G06F 1/1616 |
| 2017/0235355 A1* | 8/2017 | Alshinnawi | G06F 1/3278 |
| | | | 713/323 |
| 2017/0366034 A1* | 12/2017 | Matsui | H02J 50/402 |
| 2018/0329622 A1* | 11/2018 | Missig | G06F 3/0219 |
| 2020/0249726 A1* | 8/2020 | Brocklesby | G06F 1/1683 |
| 2020/0349903 A1* | 11/2020 | Pelissier | G06F 3/013 |

\* cited by examiner

CONTROLLING RADIO FREQUENCY (RF) POWER OUTPUT OF PORTABLE DEVICES

BACKGROUND

Electronic devices, such as portable and handheld computing devices are generally provided with wireless communication capabilities to provide wireless services to the users. For example, a device may include circuitry for providing Wi-Fi connectivity to enable the device to connect to the internet and may simultaneously include circuitry for providing Bluetooth connectivity to allow the device to communicate with nearby devices.

Each of the wireless modules incorporate one or more antennas that emits wireless radiations which facilitates communication of the device with other devices or the internet.

BRIEF DESCRIPTION OF FIGURES

The following detailed description references the drawings, wherein.

DETAILED DESCRIPTION

Portable devices, such as smartphones, personal digital assistant (PDAs), and tablets, may communicate wirelessly with a variety of devices. The portable devices include wireless antennas that transmit and receive radio waves to couple to a radio network that enable wireless communication between the devices. The frequency of the radio waves, and in turn the radio frequency (RF) power output of portable devices, depends on the wireless communication protocol of the radio network.

These radio waves, transmitted into the air, are also absorbed by the human body. Specific absorption rate (SAR) is a measure of a rate at which RF energy is absorbed by a body. The SAR indicates the amount of energy absorbed in a unit of time with respect to a tissue per unit mass of a human body exposed to radio waves. Several regulatory authorities have prescribed a maximum allowable RF power output that wireless antennas may use in order to limit the SAR to a level that does not have any adverse effect on users.

The SAR values are defined for a 'proximal use position' of the device. The proximal use position may be understood as a position where the device is in proximity to a user, such that a potential risk to the users, due to exposure to the RF energy, exists. For example, for a smartphone, a 'proximal use position' is a position close to users' ears where the users place the smartphone while making calls or a position of accessories, such as belt-clips and holsters, where the users generally place the smartphone on their bodies.

The regulatory provisions mandate the manufacturers to ensure that the portable devices adhere to the maximum RF power output when in such proximal use positions. To comply with the regulatory provisions, manufacturers of such portable devices, generally restrict the maximum RF power output of the portable devices such that the radio waves transmitted by the devices do not exceed the prescribed SAR value. Restricting the maximum RF power output for all positions of the portable devices, for example, a non-proximal position in which a user may hold the smartphone away from his body, to watch a streamed media content, may needlessly impede the capability of the devices.

According to an example implementation of the present subject matter, techniques for controlling the RF power output of the portable devices, such that the devices are enabled to transmit higher RF power outputs and yet comply with the regulatory restrictions relating to SAR, are described.

In an example implementation of the present subject matter, a mode in which the portable device may be currently operating is determined. In an example, modes of the portable device are defined based on the inclination of the portable device, and are indicative of positions of the device that are proximal to the user, such that the prescribed SAR limits are applicable and the positions where higher RF power output may be used. In an example, the inclination of the portable device is measured in reference to a screen of the portable device and a horizontal surface, such that the inclination of the portable device is zero degrees when the screen touches the horizontal surface. The RF power output of the portable device is controlled based on the RF power level predefined for the given mode of the portable device.

The above described techniques are further described with reference to FIGS. 1 to 7. It should be noted that the description and figures merely illustrate the principles of the present subject matter along with examples described herein and, should not be construed as a limitation to the present subject matter. It is thus noted that various arrangements may be devised that, although not explicitly described or shown herein, describe the principles of the present subject matter. Moreover, all statements herein reciting principles, aspects, and examples of the present subject matter, as well as specific examples thereof, are intended to encompass equivalents thereof.

FIGS. 1(a)-(g) schematically illustrate different example modes of a portable device 100, according to an example implementation of present subject matter. The portable device 100 may be a handheld device that may connect to a network or the internet, and may communicate with other devices using wireless communication techniques. Examples of the portable device 100 include smartphones, personal digital assistant (PDAs), tablets, e-readers, media players.

Figure 1:
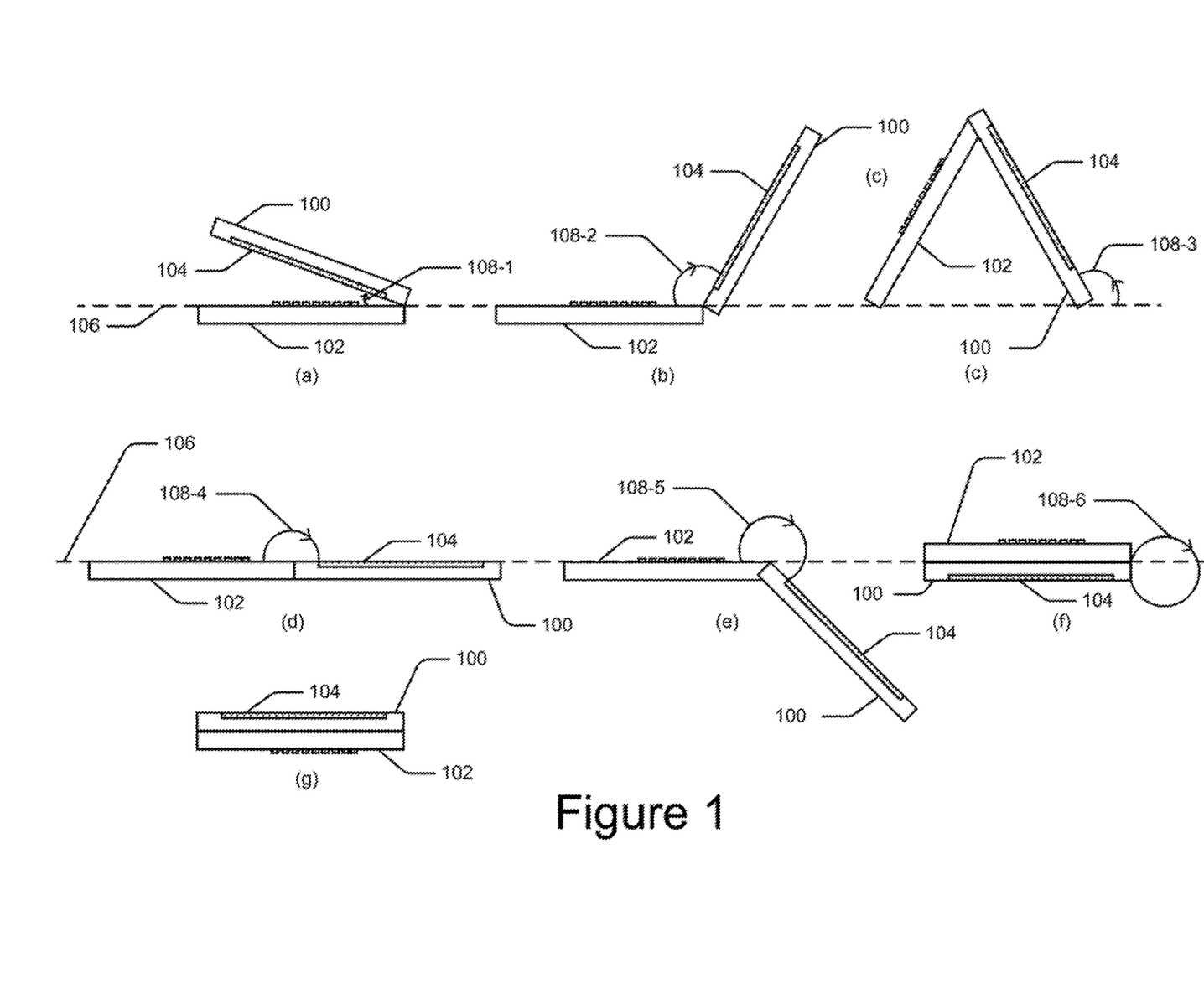
FIGS. 1(a)-(g) illustrate different example modes of a portable device.

In accordance with an example implementation of the present subject matter, the modes of the portable device 100 may be considered as inclination of the portable device 100 (or part thereof) with respect to a horizontal plane. In the examples as depicted in FIG. 1, the inclination of the portable device 100 may be determined based on the inclination of the display screen of the portable device 100 with respect to a horizontal plane 106. In such instances, the inclination of the screen with respect to the horizontal plane would be indicative of one or more modes of the portable device 100. It should be noted that inclination of the screen being representative of the inclination of the portable device 100 is only exemplary and should not be construed as a limitation. Other portions or planes of references may be considered without deviating from the scope of the present subject matter.

Examples of various modes include, but is not limited to, closed mode, vertical mode, flat mode and tablet mode based on the inclination of the portable device being about 0-35 degrees, 36-160 degrees, 161-200 degrees and 201-360 degrees, respectively. The inclination is measured in reference to a screen of the portable device and a horizontal surface, such that the inclination of the portable device is zero degrees when the screen touches the horizontal surface. As mentioned above, the mode of the portable device 100 is indicative of positions of the portable device 100 in which the prescribed SAR limits are to be adhered to and the positions where the portable device 100 may have higher RF power outputs. According to examples of the present subject matter, the closed mode, flat mode and tablet mode are identified to correspond to positions where the RF power output is to be set to a low power level in accordance with the prescribed SAR limits. These modes, as will be explained below, correspond to positions where potential risk to the users due to exposure to the RF energy may exists. The vertical mode, on the other hand, corresponds to a position where the RF power output may be set to a high power level, i.e., a power level that may be higher than the power level corresponding to the prescribed SAR limits.

The modes of the portable device 100 are based on the inclination of the portable device 100. In an example, the modes can be identified based on determining the inclination of the portable device 100, for example, by a tilt sensor (not shown), such as a three-axis gravity sensor included in the portable device 100. In another example, the inclination of the portable device 100 and in turn the modes can be identified based on an interaction of the portable device 100 with an input/output (I/O) devices (not shown) or a peripheral (not shown), if any, attached to the portable device 100.

To elaborate, the portable device 100 may be connected to I/O devices, such as docking stations and keyboards that are connected to the portable device 100 through its I/O ports. Further, the portable device 100 may also be attached to accessories or peripherals, such as a lid that may serve to cover a display screen of the portable device or a stand that may support the portable device 100 in a standing position. In some cases, an I/O device, such as a keyboard connected to the portable device 100, may also act as a peripheral, such as a lid for the portable device 100.

For the ease of explanation, the various example modes of the portable device 100, depicted in FIGS. 1(a)-(g), are explained in context of the portable device 100, for example a tablet, being attached to an I/O device, such as a keyboard 102 that may also serve as a lid for the portable device 100.

FIG. 1(a) shows the portable device 100 in the closed mode. The portable device 100 is determined to be in the closed mode when a screen 104 of the portable device 100 is inclined in the range of about 0 degrees to about 35 degrees with respect to the horizontal surface 106. An arrow 108-1 depicts the inclination. As mentioned above, in an example implementation, the inclination of the portable device 100 in the range of 0-35 degrees may be determined by the tilt sensor of the portable device 100.

In cases where the portable device 100 is attached to the keyboard 102, wherein a bottom surface of the keyboard 102 is resting on a horizontal surface, as depicted in FIG. 1(a), the angle between the respective surfaces of the keyboard 102 and the portable device 100 that face each other, is in the range of about 0-35 degrees in the closed mode. Since the keyboard 102 may also act as a lid for the portable device 100, in the closed mode, a display screen of the portable device 100 may rest on a surface of the keyboard. When the portable device 100 is in contact with the keyboard 102 or inclined towards it, a contact sensor (not shown) of the portable device 100 may detect the proximity of the portable device 100 with the keyboard 102 or the lid, as the case may be. In one example, the contact sensor may be a magnetic sensor that may interact with a corresponding magnetic component in the keyboard 102 or the lid to detect the proximity. Accordingly, an example implementation, an input from the contact sensor may also be indicative of the inclination of the portable device 100 being in the range of about 0-35 degrees and be determinative of the mode being the closed mode.

FIG. 1(b) shows the portable device 100 in the vertical mode. The portable device 100 is determined to be in the vertical mode when it is inclined in the range of about 36 degrees to about 160 degrees with respect to the horizontal surface 106 as shown by arrow 108-2. In an example implementation, the inclination of the portable device 100 corresponding to the vertical mode may be determined by the tilt sensor of the portable device 100. In another example implementation, where the portable device 100 is attached to keyboard 102 or another VO device, such as a docking station, a coupling detector sensor (not shown) of the portable device 100 may generate a signal to indicate the coupling of the two devices. The signal generated by the coupling detector sensor, together with the input of the tilt sensor, or otherwise, may be used to determine the inclination of about 36-160 degrees and the corresponding mode as the vertical mode. In one example, inputs from one or more of the tilt sensor, contact sensor and coupling detector sensor may be used in any combination to determine the mode.

FIG. 1(c) shows another example position in which the portable device 100 is in the vertical mode. As depicted, the keyboard 102 or the lid, as the case may be, may also serve as a stand to support the portable device 100 in a standing position. The screen 104 of the portable device 100 has an inclination in the range of about 36-160 with respect to a horizontal surface 106, such as the horizontal surface 106 with which the screen 104 would make a zero degree inclination upon being in contact, as depicted by the arrow 108-3.

FIG. 1(d) shows the portable device 100 in the flat mode where the screen 104 of the portable device 100 is inclined in the range of about 161 degrees to about 200 degrees with respect to the horizontal surface 106. Depicted in the Figure by arrow 180-4 is an angle of about 180 degrees in the flat mode. The explanation regarding how the vertical mode may be determined is applicable for the flat mode as well.

In the tablet mode shown in FIG. 1(e), the screen 104 is inclined in the range of about 201-360 degrees with respect to the horizontal surface 106 as depicted by the arrow 108-5. FIG. 1(f) shows another example of the tablet mode where the inclination is about 380 degrees as shown by arrow 108-6. Of course, in such a case the portable device 100 may be used with the screen 104 facing upwards as shown in FIG. 1(g).

In an example implementation, the inclination of the portable device 100 corresponding to the tablet mode may be determined by the tilt sensor of the portable device 100. In another example implementation, in cases where the portable device 100 is detached from the keyboard 102 or another I/O device, such as a docking station, to position the portable device 100 in the inclination corresponding to the tablet mode, the coupling detector sensor may generate a signal to indicate the decoupling of the devices. The signal generated by the coupling detector sensor, alone or together with the input of the tilt sensor may be used to determine the inclination corresponding to 201-360 degrees and the mode as the tablet mode.

It would be appreciated that the while the FIGS. 1(*a*)-1(*g*) depict examples of the modes considering the portable device 100 to be a handheld device, such as a tablet or a smartphone connected to an external keyboard, the concept of controlling the RF power output based on the modes, as described herein, is also applicable to other devices, such as laptops that incorporate an integrated keyboard.

Figure 2:
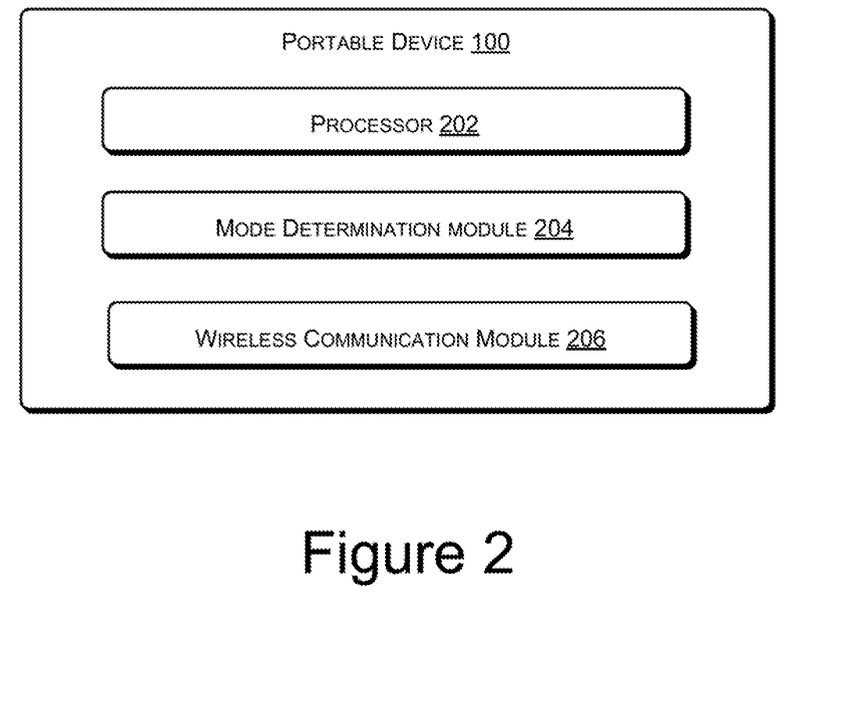
FIG. 2 illustrates the portable device, in accordance with an example implementation of the present subject matter.

FIG. 2 illustrates the portable device 100, in accordance with an example implementation of the present subject matter to explain how the power output of the portable device 100 is controlled in accordance with the modes described above.

In an example, the portable device 100 comprises a processor 202 and a mode determination module 204 as well as a wireless communication module 206, both coupled to the processor. The mode determination module 204 determines the mode of the portable device 100 based on the inclination of the portable device 100. As described above, the inclination is measured in reference to the horizontal surface 106 and the screen 104 of the portable device 100, such that the inclination is zero degrees when the screen is in contact with the horizontal surface 106.

Based on a given mode of the portable device 100, determined by the mode determination module 204, the wireless communication module 206 determines an RF power level defined for the mode of the portable device 100. The wireless communication module 206 also controls the RF power output of the portable device 100 based on the determined RF power level. In an example implementation, the wireless communication module 206 controls the RF power output by setting the RF power level at a low level or a high level based on the RF power level defined for the given mode. Details regarding controlling the RF power output of the portable device 100, are elaborate below with reference to FIG. 3.

Figure 3:
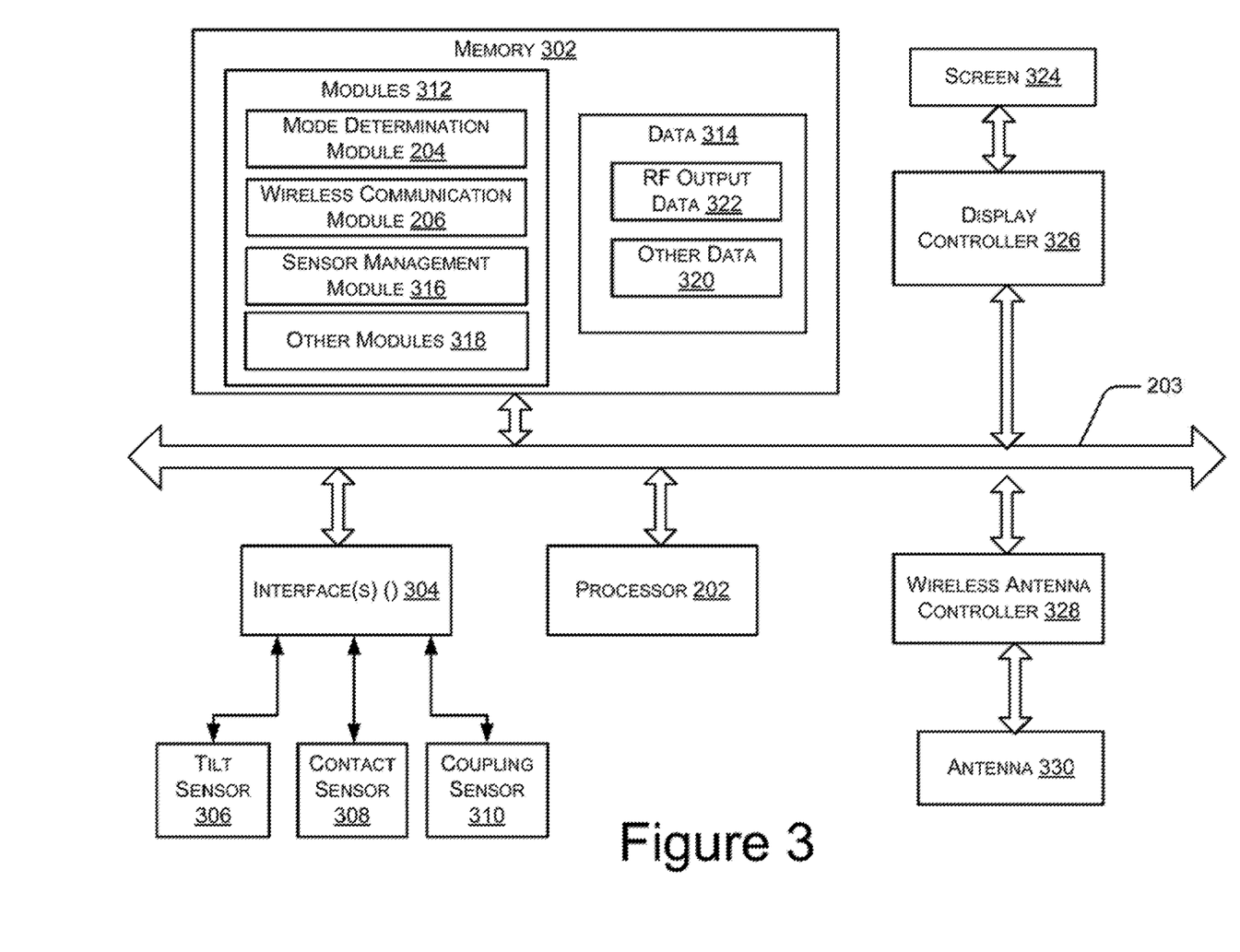
FIG. 3 illustrates the portable device, in accordance with another example implementation of the present subject matter.

FIG. 3 illustrates the portable device 100, in accordance with another example implementation of the present subject matter. As shown in FIG. 3, the portable device 100 comprises the processor 202 coupled to a memory 302 and interface(s) 304. The processor 202, the memory 302 and the interfaces may interact through a bus, such as bus 203. Examples of the bus 203 include, a Computer Automated Measurement and Control (CAMAC) bus, an Industry Standard Architecture (ISA) bus, a Microchannel bus, a Hyper-Transport bus, Serial Peripheral Interface (SPI) bus.

The processor 202 may be implemented as microprocessors, microcomputers, microcontrolers, digital signal processors, central processing units, state machines, logic circuitries, and/or any devices that manipulate signals based on operational instructions. Among other capabilities, the processor 202 is configured to fetch and execute computer-readable instructions stored in the memory.

The functions of the various elements shown in the FIGS. 2 and 3, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 304 may include a variety of software and hardware interfaces that allow the portable device 100 to interact with the I/O devices (not shown), such as the keyboard 102 or a docking station. In an example implementation, the interface(s) 304 also couple the processor 202 to a tilt sensor 306, contact sensor 308 and coupling sensor 310. As described earlier, the inputs from the tilt sensor 306, contact sensor 308 and coupling sensor 310 are used to determine the mode of portable device 100.

The memory 302 may include any computer-readable medium known in the art including, for example, volatile memory (e.g., RAM), and/or non-volatile memory (e.g., EPROM, flash memory, etc.). Modules 312 and data 314 may reside in the memory 302. The modules 312 include routines, programs, objects, components, data structures, and the like, which perform particular tasks or implement particular abstract data types. In an example, the modules 312 include a sensor management module 316 in addition to the aforementioned mode determination module 204 and wireless communication module 206 as described with reference to FIG. 2. The modules 312 also comprise other modules 318 that supplement applications on the portable device 100, for example, modules of an operating system.

The data 314 serves, amongst other things, as a repository for storing data that may be fetched, processed, received, or generated by the modules 312. The data 314 comprises other data 320 corresponding to the other modules 318. In the illustrated example implementation, the data 314 of the portable device 100 also comprises RF output data 322. In an example, the RF power level defined for each of the modes of the portable device 100 may be stored in the RF output data 322.

In operation, the sensor management module 316 communicates with the tilt sensor 306 to receive data regarding the inclination of a screen 324 of portable device 100. In an example, the tilt sensor 306 is a gravity sensor, such as a three-axis gravity sensor, incorporated in the portable device 100 to enable a display controller 326, associated with the screen 324, to manage the orientation of a content displayed on the screen 324 in accordance with the orientation and inclination of the portable device 100.

Along with the data regarding the inclination of the screen 324, the sensor management module 316, also receives an input indicative of the portable device 100 being in contact with a lid (not shown) from the contact sensor 308 and a signal indicative of the portable device 100 being attached to an VO device from the coupling sensor 310. In an example, the contact sensor 308 may be a magnetic sensor, such as a Hall sensor that generates the signal in coming in proximity of a magnetic component in the lid. In some cases, the portable device 100 may implement the magnetic sensor to enable a state of the portable device 100 to be changed from a power-on state to a power-off or standby state when the portable device 100 comes in contact with the lid. The coupling sensor 310 may be, for example, a pogo-pin connector that has a spring loaded pin that gets activated upon coupling of the portable device 100 with another device, for instance, the I/O device, such as a docking station.

As explained previously, the mode determination module 204 determines the mode of the portable device 100 based on the inclination of the portable device 100. For the purpose, the mode determination module 204 uses the inputs from the tilt sensor 306, contact sensor 308 and coupling sensor 310 collated by the sensor management module 316. Based on a current mode of the portable device 100 that the mode determination module 204 identifies, the wireless communication module 206 determines the RF power level defined for the current mode of the portable device 100. In an example, the RF power level corresponding to each of the different modes of the portable device 100 may be stored in the memory 302 of the portable device 100. In an example, the RF output data 322 may store the RF power level corresponding to the different modes.

In an example implementation, RF power level may be defined to be a low level or a high level for the different modes the portable device 100. According to examples of the present subject matter, the low RF power level may be used for the closed mode, flat mode and tablet mode while the high RF power level may be used for the vertical mode. The low level of RF power is defined for modes that correspond to positions where the RF power output is to be in accordance with the prescribed SAR limits. The high level of RF power, i.e., an RF power level higher than the power level corresponding to the prescribed SAR limits, is used for modes that corresponds to other positions. In various other implementations, several values for RF power level, such as low, medium, high may also be defined for the different modes the portable device 100.

Once the RF power level corresponding to the current mode is determined, the wireless communication module 206 interacts with a wireless antenna controller 328 of the portable device 100 to control the RF power output of the portable device 100. The communication module 206 may interact with the wireless antenna controller 328 through the bus 203. The wireless antenna controller 328 sets the RF power level of an antenna 330 of the portable device 100 to RF power level determined to correspond to the current mode of the portable device 100. Controlling the RF power output of the portable device 100 in accordance with the modes, allows compliance with the prescribed SAR limits and provides for the portable device 100 to have enhanced wireless communication capabilities as well.

Figure 4:
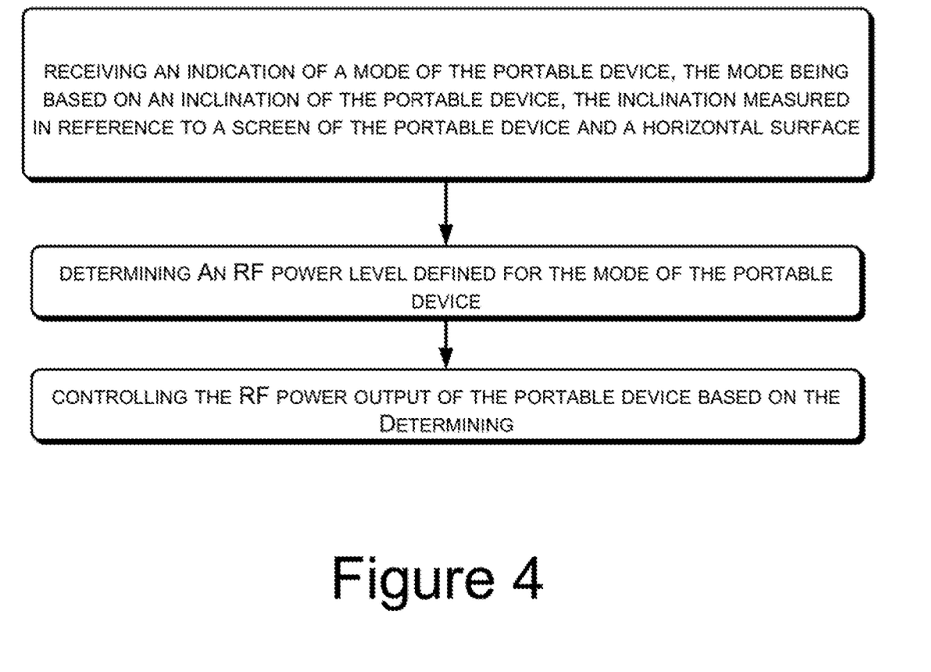
FIG. 4 illustrates a method for controlling radio frequency (RF) power output of the portable device, according to an example of the present subject matter.

FIG. 4 illustrates a method 400 for controlling radio frequency (RF) power output of the portable device, according to an example of the present subject matter. It will be understood that the method 400 may be implemented in any portable device that has wireless communication capabilities. Examples of such portable devices include, mobile devices, e-readers, and PDAs. For the ease of explanation, the steps of the method 400 are explained in reference to the above-described portable device 100.

Referring to block 402, an indication of the mode of the portable device 100 is received by the by the wireless communication module 206 of the portable device 100. As discussed earlier, the mode of the portable device is based on the inclination of the screen 104 of the portable with respect to the horizontal surface 106. In an example, the inclination of the portable device 100 may be assigned to be zero degree when the screen 104 is in contact with the horizontal surface 106.

After the mode of the portable device is determined at block 402, the wireless communication module 206 determines the RF power level of the portable device 100 at block 404 based on the RF power level defined in the RF output data 322. Finally, at block 406, the wireless communication module 206 controls the RF power output of the portable device 100 in accordance with the RF power level determined at block 402.

Figure 5:
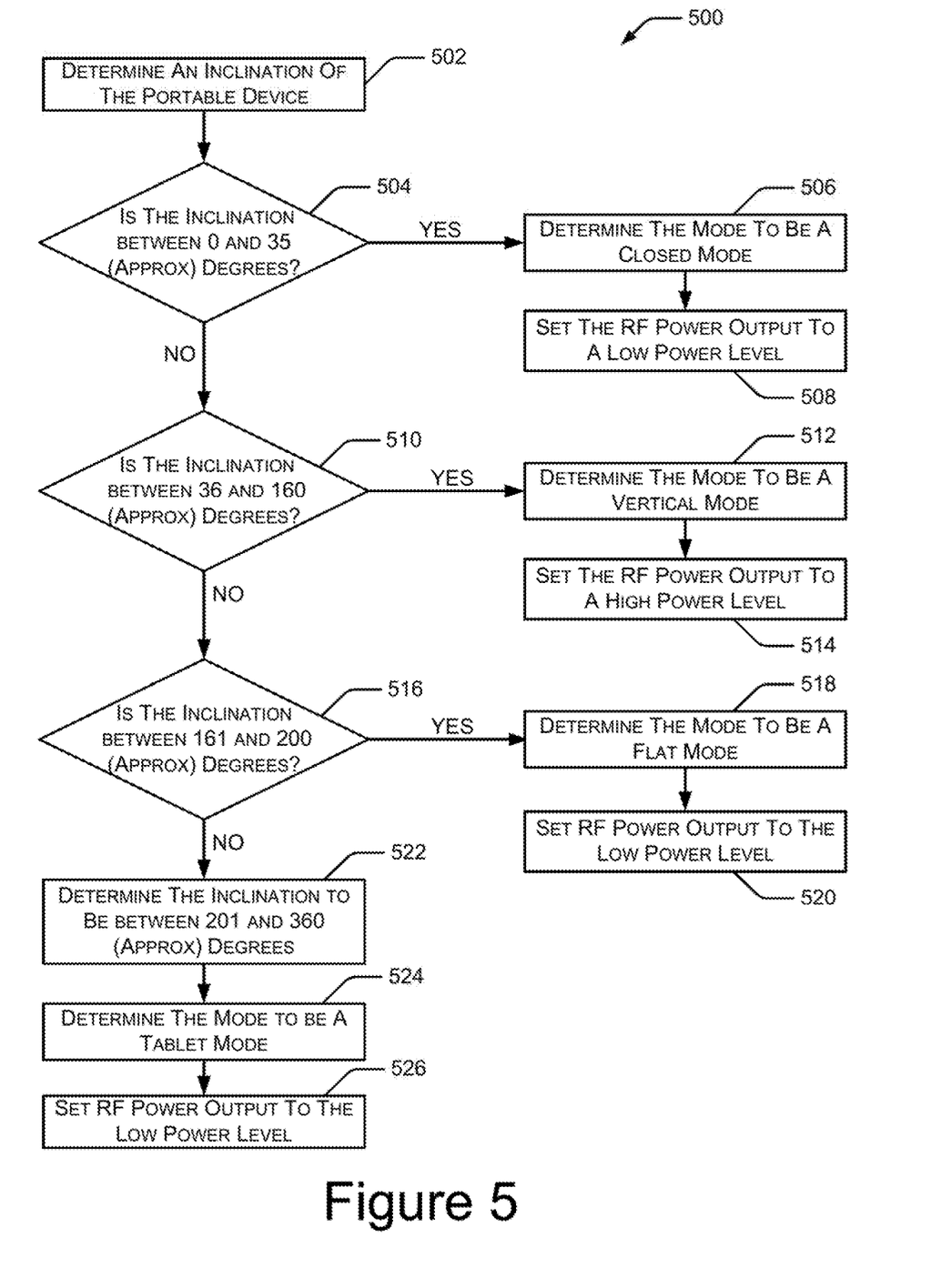
FIG. 5 illustrates a method for controlling the RF power output, according to another example of the present subject matter.

FIG. 5 illustrates a method 500 for controlling the RF power output the portable device 100, according to another example of the present subject matter.

The method initiates at block 502 where the wireless communication module 206 determines the inclination of the portable device 100. At block 504, it is determined whether the inclination of the portable device 100 lies in the range of about 0-35 degrees. The inclination of the portable may be measured by the tilt sensor 306, in an example. If the angle of inclination is in the range 0-35 degrees, the method proceeds to block 506 and the portable device 100 is determined to be in the closed mode. Once the portable device 100 is determined to be in the closed mode, at block 508, the RF power output of the portable device 100 is set to the low power level. In an example, the RF power output of a wireless antenna, such as a Wi-Fi antenna, Bluetooth antenna of the portable device 100 is set to be in accordance with the low power level.

At block 504, if it is determined that the inclination of the portable device 100 does not lies in the range of about 0-35 degrees, the method proceeds at block 510. At block 510, it is determined if the angle of inclination of the portable device 100 lies in the range of about 36-160 degrees. If the determination is affirmative, the method proceeds at block 512 and the portable device 100 is determined to be in the vertical mode. Thereafter the method proceeds to block 514 where the RF power output of the portable device 100 is set to the high power level.

If the determination made at block 510 is negative, the method proceeds to block 516. At block 516, it is determined if the inclination of the portable device 100 lies in the range of about 161-200 degrees. If the inclination determined at block 516 lies in the range of 161-200 degrees, the method proceeds at block 518 and the portable device 100 is determined to be in a flat mode. After the portable device 100 is determined to be in the flat mode, the method proceeds to block 520 and the RF power output of the portable device 100 is set to the low power level.

The method proceeds to block 522, if the inclination determined at block 516 is determined to not lie in the range of about 161-200 degrees. At block 522, it is determined that the inclination of the portable device 100 is in a range of about 201-360 degrees. As it would be apparent, if the inclination of the portable device 100 is determined not to be in range of about 0-35, 36-160, and 160-200 degrees, the portable device 100 is inclined at about 201-360 degrees. Thus, the method proceeds to block 524 where the mode of the portable device 100 is determined to be the tablet mode. Accordingly, at block 526, the RF power output of the portable device 100 is set to the low power level.

Figure 6:
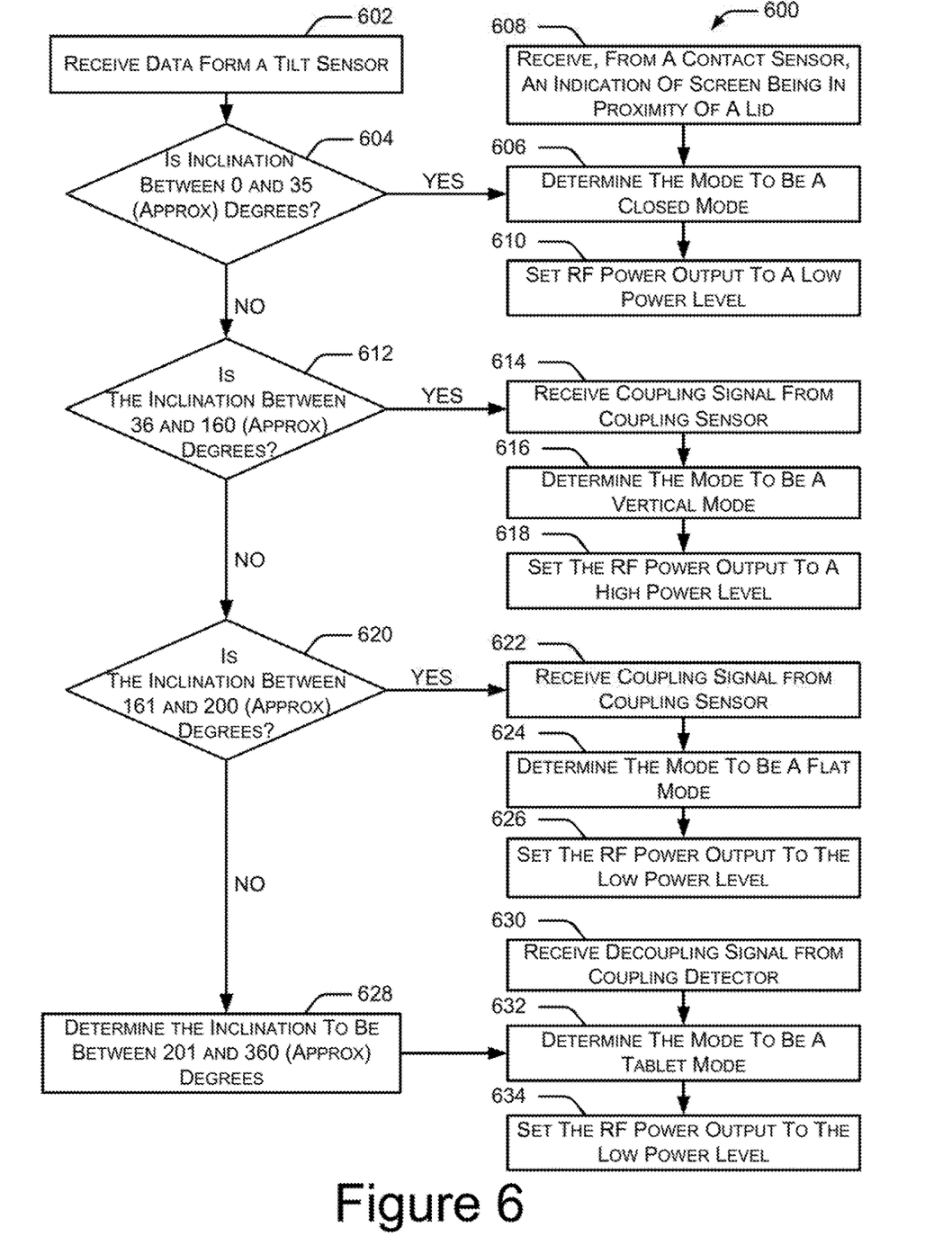
FIG. 6 illustrates another example method for controlling the RF power output.

FIG. 6 illustrates another example method 600 for controlling the RF power output. The method 600 illustrates an example implementation of the present subject matter where the RF power output is controlled based on mode of the portable device 100.

At block 602, data relating to inclination of the portable device 100 is received from a tilt sensor, for example the tilt sensor 306. At block 604, it is determined if the inclination of the portable device 100 lies in the range of about 0-35 degrees. If the degree of inclination of portable device 100 is determined to be in that range, the method proceeds at block 606 and the mode of the portable device 100 is determined to be the closed mode. Also, if at block 608, an indication of the screen 104 of the portable device 100 being in proximity of a lid is received from the contact sensor 308, it may be determined that the inclination of portable device 100 is approximately in the range of 0-35 degrees. Accordingly, the method proceeds to block 606 and the mode of the portable device 100 is determined to be the closed mode. In an alternate example implementation, the portable device 100 may be determined to be the closed mode, when the input from the tilt sensor 306 identifies the inclination of the portable device 100 to be about 0-35 degrees and simultaneously the input from the contact sensor 308 is affirmative of the screen 104 being in proximity of the lid. When the portable device 100 is determined to be in closed mode, at block 610, the RF power output of the portable device 100 is set to a low power level predefined for the closed mode.

The method block proceeds to block 612, if it is determined, at block 604 that the inclination does not lie in the range of about 0-35 degrees. At block 612, it is determined if the range of inclination of portable device 100 is about 36-160 degrees. Thereafter, the method proceeds at block 614, where a coupling signal from a coupling sensor, such as the coupling sensor 310 indicating that the portable device 100 is attached to an I/O device, such as the keyboard 102, may be received. From the block 614 and if the determination made at block 612 is affirmative, the method proceeds to block 616 where the mode of the portable device 100 is determined to the vertical mode. Once the portable device 100 is determined to be in the vertical mode, at block 618, the RF power output is set to a high power level.

When the determination at block 612 is 'no', the method 600 proceeds to block 620 where it is checked if the inclination of the portable device 100 is in the range of about 161-200 degrees. Upon a positive determination to block 620, the method proceeds at block 622 where a coupling signal from the coupling sensor 310 may be received. Thereafter, the method proceeds at block 624 and the mode of the portable device 100 is identified to be the flat mode. Thus, the method 600 proceeds to block 626 and the RF power output of the portable device 100 is set to the low power level predefined for the flat mode.

It may be mentioned that different example implementations where the mode may be determined based on the data received from the tilt sensor 306 alone, or based on data received from the tilt sensor 306 as well as the coupling sensor 310 exist and the illustrated example implementation explains one such example in a non-limiting manner.

Referring again to block 620, if it is determined that the inclination of the portable device 100 does not belong in the range of about 161-200 degrees, having exhausted the other possible ranges, at block 628, it is determined that the inclination of the portable device 100 is in the range of about 201-360 degrees. Such a determination may also be made, at block 630, based on a decoupling signal received from the coupling sensor 310 indicating that the portable device 100 has been decoupled from the VO device, for example the keyboard 102 to which it was previously coupled. Based on the inclination of about 201-360 degrees, at block 632, the mode of portable device 100 is determined to be the tablet mode and accordingly, at block 634, the RF power output is set to the low power level corresponding to the tablet mode.

Accordingly, the present subject matter provides techniques to control the RF power output of portable devices and the maximum RF power output of the portable devices is not defined to be a fixed value which is agnostic of the positions of the portable devices.

The order in which the methods 400, 500 and 600 are described is not intended to be construed as a limitation, and any number of the described method blocks may be combined in any order to implement the methods, or an alternative method. Furthermore, the methods may be implemented by processor(s) or computing device(s) through any suitable hardware, non-transitory machine readable instructions, or combination thereof. It may be understood that steps of the methods may be performed by programmed computing devices. The steps of the methods may be executed based on instructions stored in a non-transitory computer readable medium. The non-transitory computer readable medium may include, for example, digital memories, magnetic storage media, such as magnetic disks and magnetic tapes, hard drives, or optically readable digital data storage media.

Figure 7:
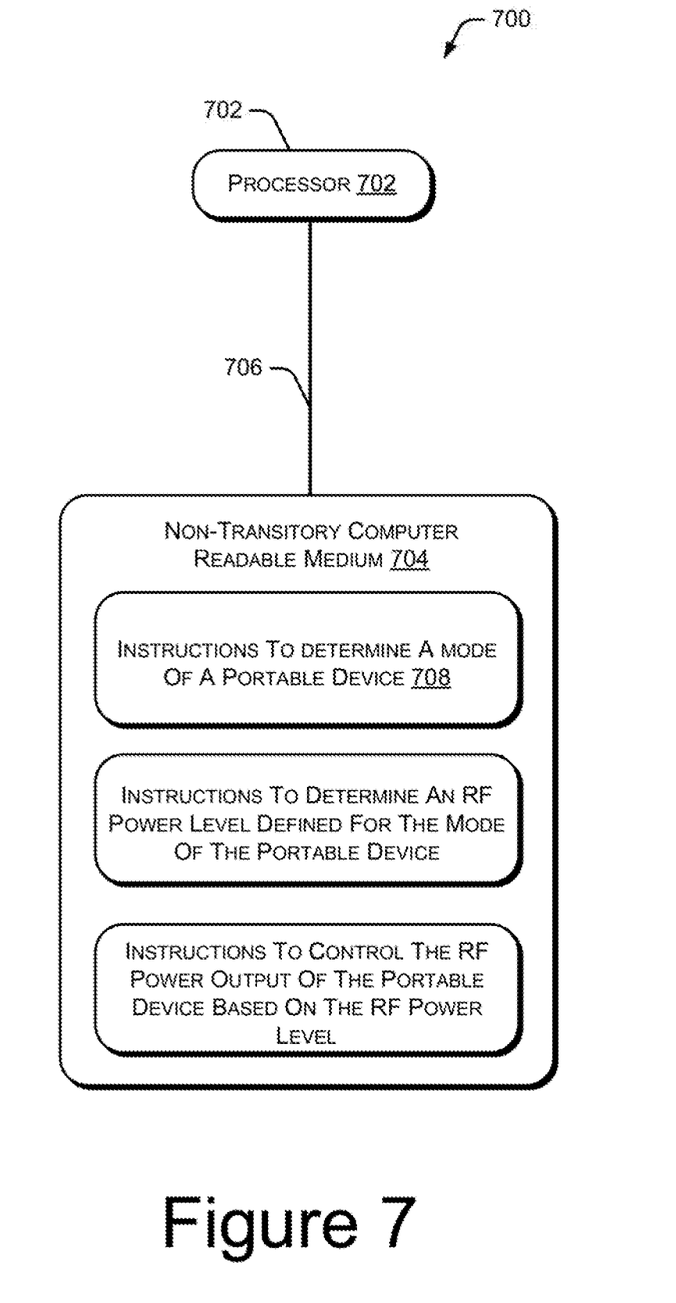
FIG. 7 illustrates a computing environment to implement the method for controlling the RF power output of the portable device, in accordance with an example implementation of the present subject matter.

FIG. 7 illustrates a system environment 700 implementing a non-transitory computer readable medium for controlling the RF power output of a portable devices, according to an example of the present subject matter. The system environment 700 includes a processor 702 communicatively coupled to the non-transitory computer-readable medium 704 through a communication link 706. In an example, the processor 702 may be a processing resource of a portable device, such as the portable device 100 for fetching and executing computer-readable instructions from the non-transitory computer-readable medium 704.

The non-transitory computer-readable medium 704 can be, for example, an internal memory device or an external memory device. In an example implementation, the communication link 706 may be a direct communication link, such as any memory read/write interface. In another example implementation, the communication link 706 may be an indirect communication link, such as a network interface. In such a case, the processor 702 can access the non-transitory computer-readable medium 704 through a communication network (not shown).

In an example implementation, the non-transitory computer-readable medium 704 includes a set of computer-readable instructions for controlling the RF output power of the portable device 100. The set of computer-readable instructions can be accessed by the processor 702 through the communication link 706 and subsequently executed to perform acts controlling the RF power output of the portable device 100.

Referring to FIG. 7, in an example, the non-transitory computer-readable medium 704 may include instructions 708 to determine a mode of the portable device 100. The mode of the portable device is determined based on the inclination of the portable device 100, an input indicative of the portable device 100 being in contact of a lid and an input indicative of the portable device 100 being attached to an I/O device, such as the keyboard 102. The inclination is measured in reference to the screen 104 of the portable device 100 and a horizontal surface 106. For reference, the inclination of the portable device 100 is zero degrees when the screen 104 touches the horizontal surface 106.

Further, the non-transitory computer-readable medium 704 may include instructions 710 to determine the RF power level defined for the determined mode of the portable device 100. Further, the non-transitory computer-readable medium 704 may include instructions 712 to control the RF power output of the portable device 100 based on the determined RF power level.

In an example implementation, the instructions 708 may cause the processor 702 to identify the portable device 100 to be in one of the closed mode, flat mode and tablet mode described above based on the inclination of the portable device 100 corresponding to one of about 0-35 degrees, 161-200 degrees and 201-360 degrees, respectively. In these modes, the RF power level of the portable device 100 is set to the low power level. The instructions 708 may also cause the processor 702 to identify the portable device 100 to be the tablet mode where the RF power level is the high power level.

The non-transitory computer-readable medium 704, comprising instructions for controlling the RF output of the portable device 100 based on the inputs of the tilt sensor 306, the contact sensor 308 and coupling sensor 310 provides for enhances wireless communication capabilities.

Thus, the methods and systems of the present subject matter provide for controlling the RF output of portable devices based on predefined modes. Although implementations for controlling the RF power output have been described in a language specific to structural features and/or methods, it is to be understood that the appended claims are not necessarily limited to the specific features or methods described. Rather, the specific features and methods are disclosed as example implementations for the portable devices and may be applicable to other electronic devices as well.

We claim:

1. A method for controlling radio frequency (RF) power output of a portable device, the method comprising:
   receiving an indication of a mode of the portable device, the mode being based on an inclination of the portable device, the inclination measured with reference to a screen of the portable device and a horizontal surface;
   determining an RF power level defined for the mode of the portable device; and
   controlling the RF power output of the portable device based on the determining,
   wherein the mode is a closed mode upon the inclination being in a range of about 0-35 degrees, a vertical mode upon the inclination being in a range of about 36-160 degrees, a flat mode upon the inclination being in a range of about 161-200 degrees, and a tablet mode upon the inclination being in a range of about 201-360 degrees, and
   wherein the RF power level defined for the closed mode, flat mode and tablet mode is a low power level and wherein the RF power level defined for the vertical mode is a high power level.

2. The method as claimed in claim 1, wherein the mode is determined based on data, regarding inclination of the portable device with respect to the horizontal surface, received from a tilt sensor.

3. The method as claimed in claim 1, wherein the mode of the portable device is identified as the closed mode based on an input indicative of the portable device being in contact with a lid.

4. The method as claimed in claim 1, wherein the mode of the portable device is identified as one of the vertical mode and flat mode based on a signal indicative of the portable device being attached to an input/output (I/O) device.

5. The method as claimed in claim 1, wherein the mode of the portable device is identified as the tablet mode based on a signal indicative of the portable device being detached from an input/output (I/O) device.

6. A portable device comprising:
   a processor;
   a mode determination module, coupled to the processor, to:
   determine a mode of the portable device based on an inclination of a screen of the portable device with respect to a horizontal surface, the inclination being zero degrees when the screen is in contact with the horizontal surface;
   a wireless communication module, coupled to the processor, to:
   determine an RF power level defined for the mode of the portable device; and
   control the RF power output of the portable device based on the RF power level,
   wherein the mode determination module is to identify the mode of the portable device as a closed mode upon the inclination being in a range of about 0-35 degrees, a vertical mode upon the inclination being in a range of about 36-160 degrees, a flat mode upon the inclination being in a range of about 161-200 degrees and a tablet mode upon the inclination being in a range of about 201-360 degrees,
   wherein the wireless communication module is to control the RF power level to be a low power level for the closed mode, flat mode and tablet mode, and
   wherein the wireless communication module is to control the RF power level to be a high power level for the vertical mode.

7. The portable device as claimed in claim 6 further comprising, a sensor controller module, coupled to the processor, to receive information regarding the inclination, from at least one sensor, wherein the mode determination module is to determine the mode based on the information.

8. The portable device as claimed in claim 7, wherein the at least one sensor comprises a tilt sensor to provide data regarding the inclination of the screen of portable device with respect to the horizontal surface.

9. The portable device as claimed in claim 7, wherein the at least one sensor comprises a contact sensor, to provide an input indicative of the portable device being in contact with a lid.

10. The portable device as claimed in claim 7, wherein the at least one sensor comprises a coupling detection sensor, to provide a signal indicative of the portable device being attached to an I/O device.

11. A non-transitory computer-readable medium comprising instructions executable by a processing resource to:
   determine a mode of a portable device based on at least one of data regarding an inclination of the portable device, an input indicative of the portable device being in contact with a lid and a signal indicative of the portable device being attached to an input/output (I/O) device, the inclination measured in reference to a screen of the portable device and a horizontal surface, such that the inclination of the portable device is zero degrees when the screen touches the horizontal surface;
   determine an RF power level defined for the mode of the portable device;
   control the RF power output of the portable device based on the RF power level;
   identify the portable device to be in a closed mode based on the inclination of the portable device being 0-35 degrees, in a flat mode based on the inclination of the portable device being 161-200 degrees, and in a tablet mode based on the inclination of the portable device being 201-360 degrees; and
   control the RF power level to be a low power level when the portable device is in any of the closed mode, flat mode, and tablet mode.

12. The non-transitory computer-readable medium as claimed in claim 11, further comprising instructions executable by the processing resource to:
- identify the portable device to be in a vertical mode based on the inclination of the portable device corresponding to about 36-160 degrees; and
- control the RF power level to be a high power level in the vertical mode.

* * * * *